J. H. HOBBS & C. W. BROCKUNIER.
Manufacture of Pressed Glass Flower and Fruit Stands.
No. 162,234.
Patented April 20, 1875.
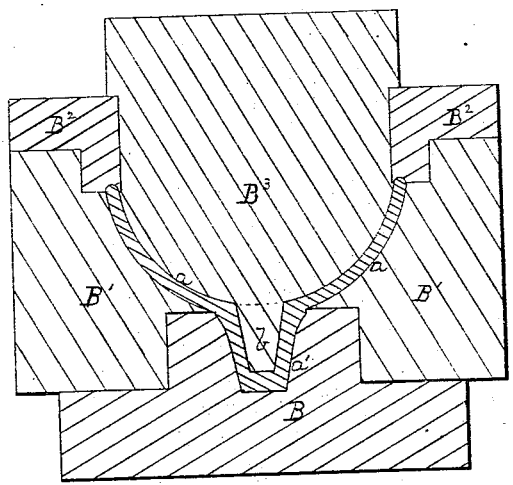
Fig. 1.
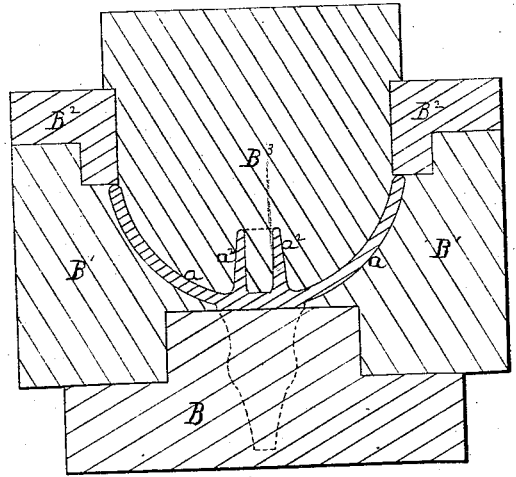
Fig. 2.
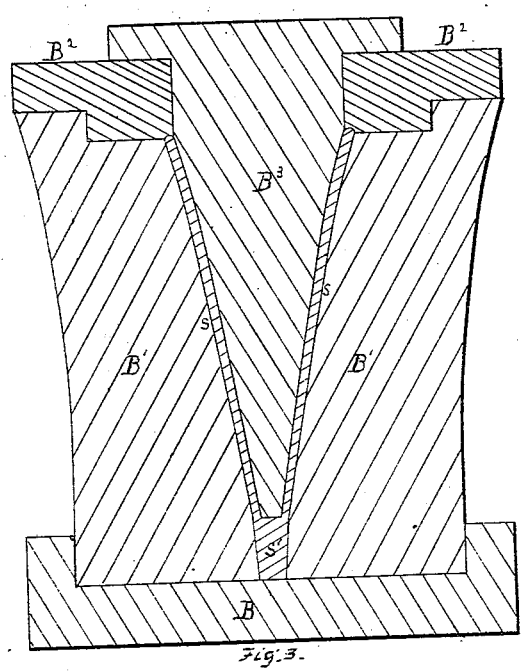
Fig. 3.
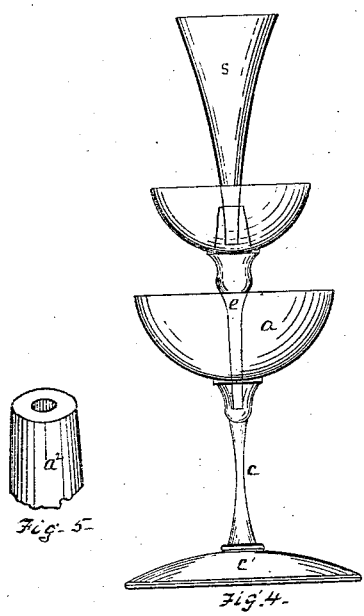
Fig. 5.
Fig. 4.

UNITED STATES PATENT OFFICE.

JOHN H. HOBBS, OF WHEELING, WEST VIRGINIA, AND CHARLES W. BROCKUNIER, OF BRIDGEPORT, OHIO.

IMPROVEMENT IN THE MANUFACTURE OF PRESSED-GLASS FLOWER AND FRUIT STANDS.

Specification forming part of Letters Patent No. 162,234, dated April 20, 1875; application filed March 27, 1875.

*To all whom it may concern:*

Be it known that we, JOHN H. HOBBS, of Wheeling, county of Ohio, State of West Virginia, and CHARLES W. BROCKUNIER, of Bridgeport, county of Belmont, State of Ohio, have invented or discovered a new and useful Improvement in the Manufacture of Pressed-Glass Flower and Fruit Stands; and we do hereby declare the following to be a full, clear, concise, and exact description thereof, reference being had to the accompanying drawing making a part of this specification, in which like letters indicate like parts.

Figures 1, 2, and 3 are sectional views of molds employed in our improvement, as hereinafter explained. Fig. 4 shows our improved manufacture in elevation; and Fig. 5 is an enlarged detached view, in perspective, of a glass socket formed in one part of the operation, as presently to be explained.

Our improvement relates to the manufacture, by pressing, of a series of glass articles to be united in a pyramidal structure for table or ornamental use, each such article having at its upper end a bowl or hollow or flat receptacle, and (except the uppermost one) a socket or pin to receive and hold the next article above, and at its lower end (except the lowest one) a pin or socket by which to be united to and supported by the article next below.

In Fig. 1, B represents the bottom of a mold; $B^1$, the sides or body; $B^2$, the ring, and $B^3$ the plunger, all of the usual construction, except that on the lower end of the plunger is a projection, $b$, which enters axially into a cavity in the bottom of the mold, so that at the same time the bowl or dish shaped article $a$ is pressed (which is done in the usual way) a hollow socket will be formed in the peg or pin $a^1$, which is thus formed thereon; but this socket, instead of being made in the peg below the inside surface of the bottom of the glass dish $a$, may be made on and above such surface, as illustrated in Fig. 2. The construction of all the parts here is the same as in Fig. 1, except that no recess is made in the bottom of the mold, but an annular recess is made in the lower end of the plunger, so that in pressing the molten glass will flow up therein, and thus make a raised socket, $a^2$. (Shown in enlarged detached view in Fig. 5.) Such bowls $a\ a$ are then joined to feet and stems in any of the ways known to the art, as illustrated in Fig. 4; but the lower one (and preferably the larger one in the structure to be built up, as there represented) is joined to a stem and foot, $c\ c'$, but the next and all above that are joined to a simple stem, $e$, the lower end of which is made to fit into the socket of the article below, where it may be jointed loosely, or by a ground or cement joint. The uppermost dish or receptacle, $s$, of the series is, preferably, pressed with the pin or peg thereon, as illustrated in Fig. 3, where the pin $s'$ is pressed at the same time and in the same operation as the body $s$ of the dish or receiver. But the separate making and attaching of the stem does not in any case form a part of our invention, since, by a suitable construction of the molds, the bowl, socket, and stem may all be pressed at one and the same operation.

The raised socket $a^2$ may also be employed as a pin to secure a like joint in connection with a correspondingly-shaped socket in the lower end of the stem of the article next above, or a raised pin pressed by a socket in the end of the plunger may be substituted therefor with like result.

In the construction of the molds described it is not necessary that the bottom B and the body $B^1$ should be made separately, as shown in Figs. 1 and 2, since a solid mold will do equally well; also, the forms of the bowl or receiver parts in the various sections of the structure thus made are not material, since some or all may be flat, like a cake-stand, or dish-shaped, with any desired form of cavity or receptacle, and any desired number of them may be united in a single structure. For table use we prefer to make the lower one for a fruit-dish, the next one for a jelly-bowl, and the upper one for a bouquet-holder.

What we claim as our invention, and desire to secure by Letters Patent, is—

1. A pressed-glass dish having a pressed socket in or on the inside bottom thereof, substantially as set forth.

2. A fruit or flower stand built up of a series of two or more sections of pressed glassware, united by a pressed pin-and-socket joint, substantially as set forth.

3. The plunger $B^3$, having a projection, $b$, thereon, in combination with a recess in the mold-bottom, for the pressing of a socket in the bottom of the pressed article, substantially as set forth.

In testimony whereof we have hereunto set our hands.

JOHN H. HOBBS.
CHAS. W. BROCKUNIER.

Witnesses:
W. J. W. COWDEN,
GEORGE H. CHRISTY.